(12) United States Patent
Jha

(10) Patent No.: US 10,789,195 B1
(45) Date of Patent: Sep. 29, 2020

(54) ARTICLE, DEVICE, AND TECHNIQUES FOR SERVERLESS STREAMING MESSAGE PROCESSING

(71) Applicant: Capital One Services, LLC, McLean, VA (US)

(72) Inventor: Maharshi Jha, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/514,992

(22) Filed: Jul. 17, 2019

(51) Int. Cl.
*G06F 13/42* (2006.01)
*G06F 9/54* (2006.01)

(52) U.S. Cl.
CPC .............. *G06F 13/42* (2013.01); *G06F 9/546* (2013.01)

(58) Field of Classification Search
CPC combination set(s) only.
See application file for complete search history.

(56) References Cited

U.S. PATENT DOCUMENTS

| 10,257,033 | B2* | 4/2019 | Shimamura | H04L 41/5045 |
| 2017/0180287 | A1* | 6/2017 | Patel | H04W 4/90 |
| 2018/0288091 | A1* | 10/2018 | Doron | H04L 63/1458 |
| 2019/0026083 | A1* | 1/2019 | Abrahami | H04L 67/327 |
| 2019/0116215 | A1* | 4/2019 | Oesterreicher | H04L 67/1097 |
| 2019/0377604 | A1* | 12/2019 | Cybulski | G06F 9/505 |

* cited by examiner

*Primary Examiner* — Raymond N Phan

(57) ABSTRACT

A non-transitory computer-readable storage medium may be executable by a processor to receive a designation of a message bus producer, a set of business logic to be stored in a set of containers, a designation of a message bus consumer, and a designation of a set of message-handling functions. The non-transitory computer-readable storage medium may generate a serverless application stack, based upon the message bus producer, the set of business logic, the message bus consumer, and the set of message-handling functions. The non-transitory computer-readable storage medium may cause the serverless application stack to receive a message stream from the message bus producer as streaming data, process the message stream according to at least one function, stored in the set of containers, perform at least one message-handling function of the set of message-handling functions on the message stream, and transport the set of messages to the message bus consumer.

17 Claims, 10 Drawing Sheets

ARTICLE, DEVICE, AND TECHNIQUES FOR SERVERLESS STREAMING MESSAGE PROCESSING

TECHNICAL FIELD

Embodiments herein generally relate to streaming data, and in particular serverless computing for streaming data.

BACKGROUND

In known stream processing technology a user may query a continuous data stream and monitor conditions within a small time period after receipt of the data. The detection time period may vary from a few milliseconds to minutes. For example, with stream processing, a data stream coming from a sensor may be queried to allow realtime action to be taken based upon changes the sensor data. There are many real-time use cases where a transactions-per-second (TPS) requirement is mid-range up to 5000 TPS. For those kind of use cases the use of heavy computer servers may be costly and time consuming. To address this issue developers may build so called "serverless computing" systems for processing streaming data.

A serverless computing system represents a type of cloud computing, where the cloud computing provider hosts user-generated computer code in so-called containers, to perform functions and operations desired by the user. The cloud computing provider runs a system of one or more computer servers to perform the user functions, and dynamically manages the allocation of machine resources. Thus, the user just uploads the desired programs/code and specifies needed resources, where computing is managed by the provider. To perform data processing using serverless computing the user is charged for the amount of resources used to run the code, where the code may be run inside stateless containers that can be triggered by a variety of events including hap requests, database events, queuing services, monitoring alerts, file uploads, scheduled events 5), etc.

For data streaming applications, a serverless computing vendor may provide real-time data streaming services capable of continuously capturing data at a very high rate, such as gigabytes of data per second from thousands of sources such as database event streams, social media feeds, website ciickstreams, database event streams, location-tracking events, financial transactions, social media feeds, and so forth. Such data may be available to a user in milliseconds to enable real-time analytics use cases such as real-time anomaly detection, dynamic pricing, and so forth.

To build serverless data streaming applications, developers may use vendor-provided resources to host the user-specified functions, as well as data streaming services provided by the vendor, so the compute functions and data streaming is managed by the vendor in a manner that can scale automatically.

The building of serverless data streaming applications may entail many challenges, including handling of incoming messages generated by the data streaming service, processing messages, and sending the messages to the appropriate container for processing.

With respect to these and other considerations, the present disclosure is provided.

BRIEF SUMMARY

In one embodiment, a non-transitory computer-readable storage medium is provided. The non-transitory computer-readable storage medium may be executable by a processor to receive a designation of a message bus producer, a set of business logic to be stored in a set of containers, a designation of a message bus consumer, and a designation of a set of message-handling functions. The non-transitory computer-readable storage medium may generate a serverless application stack, based upon the message bus producer, the set of business logic, the message bus consumer, and the set of message-handling functions. The non-transitory computer-readable storage medium may cause the serverless application stack to receive a message stream from the message bus producer as streaming data, process the message stream according to at least one function, stored in the set of containers, perform at least one message-handling function of the set of message-handling functions on the message stream, and transport the set of messages to the message bus consumer.

In a further embodiment, an electronic device is provided. The electronic device may include a storage device, and logic, at least a portion of the logic implemented in circuitry coupled to the storage device. The logic may receive a designation of a message bus producer, receive a set of business logic to be stored in a set of containers, the set of business logic comprising a set of user-generated program code, receive a designation of a message bus consumer, and receive a designation of a set of message-handling functions. The logic may generate a serverless application stack, based upon the message bus producer, the set of business logic, the message bus consumer, and the set of message-handling functions. The logic may cause the serverless application stack to receive a message stream from the message bus producer as streaming data, process the message stream according to at least one function, stored in the set of containers, perform at least one message-handling function of the set of message-handling functions on the message stream, and transport the set of messages to the message bus consumer.

In another embodiment, a method may include receiving a set of building blocks for a serverless application stack. The set of building blocks may include a set of business logic to be stored in a set of containers, where the set of business logic includes a set of user-generated program code. The set of building blocks may further include a designation of a message bus consumer; and a designation of a set of message-handling functions. The method may include generating the serverless application stack, based upon the message bus producer, the set of business logic, the message bus consumer, and the set of message-handling functions. As such, the serverless application stack may receive a message stream from the message bus producer as streaming data, process the message stream according to at least one function, stored in the set of containers, perform at least one message-handling function of the set of message-handling functions on the message stream, and transport the set of messages to the message bus consumer.

DETAILED DESCRIPTION

Figure 1A:
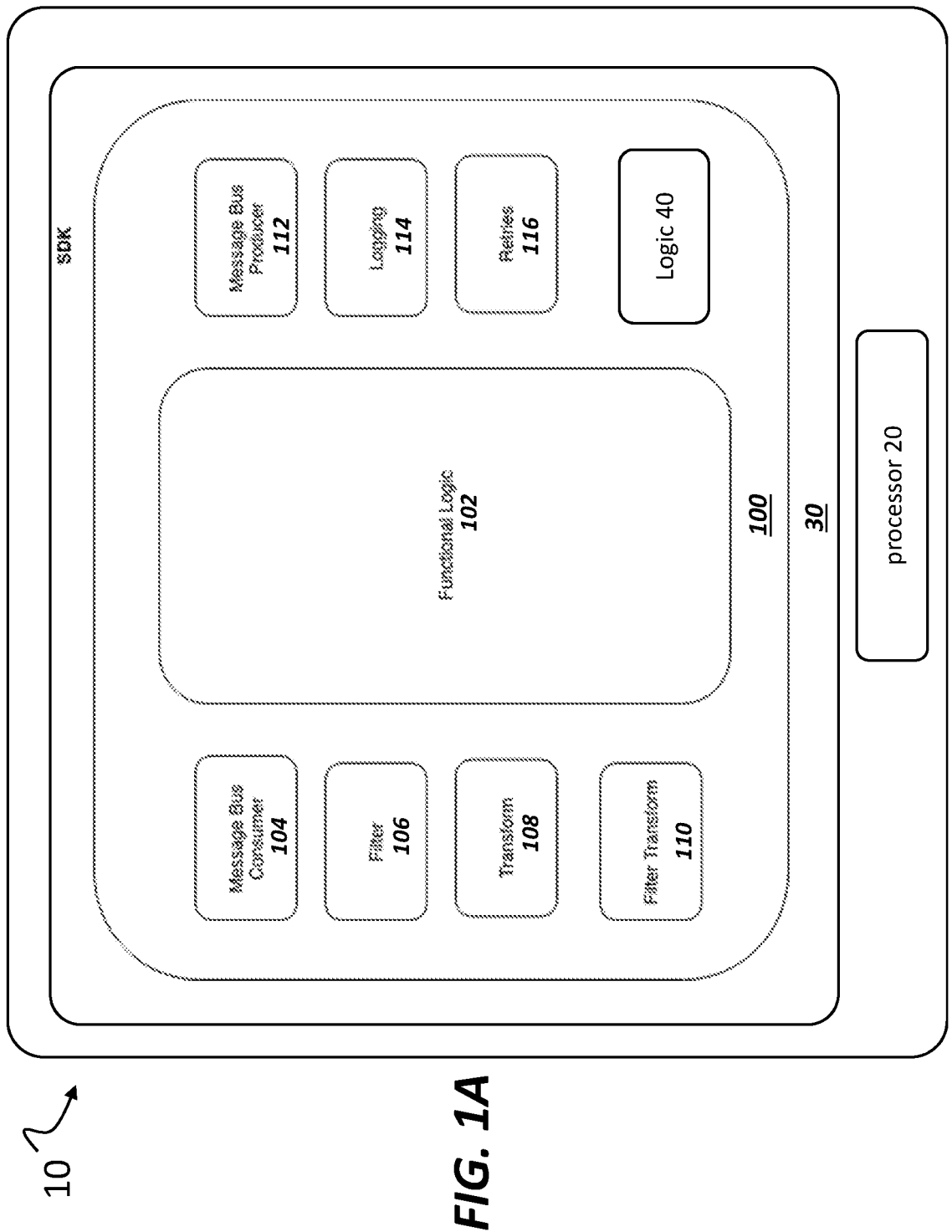
FIG. 1A illustrates an embodiment of a system.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

The present embodiments provide systems and approaches that harness a software development kit (SDK) to provide various "out-of-box" integration with cloud-based services provided by a serverless computing vendor, such as a cloud-based streaming service, a cloud based storage system, or a data lake, in some non-limiting examples. For example, the out-of-box functionalities may include message handling for interfacing with incoming messages generated by a cloud-based data streaming service, such as Amazon Kinesis® or Apache® Storm, to name non-limiting examples.

In some embodiments, an SDK is provided to handle incoming messages from a data streaming service, to log those messages and send messages to business logic. The SDK may further provide features to facilitate implementing of extract, transform, and load (ETL) functionality with minimal efforts In embodiments providing real time streaming, examples of functions include Filter, Transform, Source and Sink. The SDKs of the present embodiments provide out of the box features to facilitate implementing these features with very minimal efforts on the part of a user, as detailed below. In some examples, a filter function may be provided to filter events based upon business logic, while a transform function may provide functionality to enrich messages with additional fields or remove unwanted fields. In some non-limiting embodiments, a source function may be provided to generate the messages or for fetching messages from other sources such as Amazon S3, Amazon Kinesis, streaming data platforms, Dynamo DB, Apache Kafka, Postages DB, Cloudwatch, and so forth.

According to some non-limiting embodiments, a sink function may be provided to provide an end state of streaming such as dumping events into Amazon S3, Amazon Kinesis, streaming data platforms, Dynamo DB, Apache Kafka, Postages DB, Cloudwatch and so forth.

In various embodiments, an SDK may include an out of the box deduplication feature, such as a deduplication function. In particular embodiments, an SDK is provided having functionality to build a serverless application stack that maintain a message's unique identifier in cache memory, and to ensure that every message is unique. In particular implementations, in cases where a duplicate message is identified, the duplicate message may be simply dropped with logging.

According to particular embodiments of the disclosure, a streaming data platform such as Amazon Kinesis may be used as a message transport layer. In these instances, an SDK is provided to handle writing of events into the Kinesis platform. In particular, the SDK may write all success messages from business logic to a destination Kinesis platform, as well as handling retries in the case of message failures.

In various embodiments, an SDK may provide exception-handling features which features aid in the retry of failed messages. In one implementation, an SDK may provide two kind of retries: application level exceptions and system level exceptions.

In an implementation of application level exceptions, messages may be retried for a fixed number of times, such as a predetermined number or a user-determined number of times. For example, an SDK may be arranged to place a message back into the platform such as Kinesis with a fixed number of retries.

In an implementation of system level exceptions, all message processing may be blocked until an exception has been resolved.

According to embodiments of the disclosure, an SDK may provide event envelope management. This feature involves wrapping of messages into a predefined uniform event payload, which process will help to debug the messages in production.

In some embodiments of the disclosure, an SDK may facilitate Amazon Lambda ("Lambda") environment management, where out of the box functionality is provided to manage the Lambda environment variables, aiding a developer to access and set a Lambda environment without the need for implementing any code.

In some embodiments of the disclosure, an SDK may provide logging management where functionality is provided to manage application logging by just configuring environment variables.

According to some embodiments of the disclosure, an SDK may provide functionality to enable root level debugging, which feature can turn on all dependency debug logging.

FIG. 1A depicts a schematic of an exemplary electronic device, labeled a device 10, according to various embodiments of the disclosure. The device 10 may include a storage device, such as a memory 30. In some non-limiting embodiments, the device 10 may be implemented in a computer, desktop computer, laptop computer, tablet, or other electronic device. The device 10 may include a processor 20, including circuitry to implement various operations as detailed below in conjunction with the memory 30. According to embodiments of the disclosure, the memory 30 may include components for implementing serverless application stacks to operate any suitable serverless computing functions such as data streaming operations or batch processing.

As shown in FIG. 1A, the memory 30 may include a software development kit 100 (SDK), including several different components, as detailed herein. In the example of FIG. 1A, the memory 30 may include components that are selectable by a user or arranged in a pre-configured architecture. In FIG. 1A, the SDK 100 includes a functional logic component 102. The functional logic component 102 may receive and store one or more routines, programs, algorithms to operate a streaming of batch processing operation.

In exemplary non-limiting embodiments, the SDK 100 may include a message bus producer component 112, a message bus consumer component 104, a filter component 106, a transform component 108, a filter transform component 110, a logging component 114, and a retries component 116.

In operation, the SDK 100 may be provided and implemented at least partially as a menu of selections, including the aforementioned components. In other embodiments, one or more components of SDK 100 may be automatically provided without user selection. When implemented by a user, the SDK 100 may generate one or more serverless application stacks, as detailed below. As an example, the SDK 100 may include logic 40, which logic may be implemented in circuitry of the processor 20 to perform various operations to build a serverless application stack.

For example, the logic 40 may receive a designation of a message bus producer, provided by the SDK 100. Said differently, the SDK 100 may provide a selection means for a user to define a message bus producer, as generally represented by the message bus producer component 112. The message bus producer component 112 may be presented in a user interface in one implementation, where the user is provided with the ability to specify a particular message bus producer. Examples of message bus producers include streaming data services, databases and the like. For example, a messaging application that processes hotel reservations might have a message bus producer component and a message bus consumer component. A message bus producer component may send a message to the message bus consumer component when a customer reserves a hotel room.

To implement a serverless application stack, the logic 40 may further receive a set of business logic to be stored in a set of containers, where the business logic is represented by functional logic component 102 of the SDK 100. As in known serverless applications, the contents of the functional logic component 102 may be generated by a user and may be designated by the user for storage and execution by a serverless computing provider. The set of business logic provided by the user in the functional logic component 102 may be a set of user-generated program code to perform a serverless data streaming operation, for example. As such, the SDK 100 facilitates loading the user-generated code for running a serverless operation.

Moreover, the logic 40 may receive a designation of a message bus consumer, provided by the SDK 100. Said differently, the SDK 100 may provide a selection means for a user to define a message bus consumer, as generally represented by the message bus consumer component 104.

In addition, the logic 40 may receive a designation of a set of message-handling functions, where these message handling functions are generally represented by the additional components of the SDK 100, such as those components shown in FIG. 1A. A filter component 106 may provide message filtering for a serverless application stack built using the SDK 100. In particular, the filter component 106 may be employed to filter events based upon the logical component 102, employed to build a serverless application stack.

Likewise, a transform component 108 may provide message transformation function for a serverless application stack built using the SDK 100. A transform function may in particular provide functionality to enrich messages with additional fields or to remove unwanted fields.

A filter transform component 110 may provide message filtering and transformation function for a serverless application stack built using the SDK 100.

A logging component 114 may also be provided by the SDK 100. Use of the logging component 114 may provide out of box logging for debugging in the SDK 100 or a root level debug.

A retries component 116 may also be provided by the SDK 100. Use of the retries component 116 may be implemented with Application level and System level Retries, as well as a Dead Letter Queue for handling failed messages.

As such, based upon the aforementioned components of SDK 100, the logic 40 of SDK 100 may generate a serverless application stack, based upon, for example, a selection of message bus producer, the set of business logic provided in functional logic component 102, a selection of message bus consumer, and selection of a set of message-handling functions. In some embodiments, a set of message handling functions, such as any of the aforementioned components of the SDK 100, may be automatically set to operate without selection by the user.

In operation, according to some embodiments, when a serverless application stack is built by a user, the logic 40 of the SDK 100 may cause the serverless application stack to perform various functions in an application such as batch processing or streaming data processing. For example, the SDK 100 may operate to receive a message stream from a message bus producer as streaming data, process the message stream according to at least one function, stored in a set of containers, perform at least one message-handling function of the set of message-handling functions on the message stream, as well as to transport the set of messages to the message bus consumer.

Figure 1B:
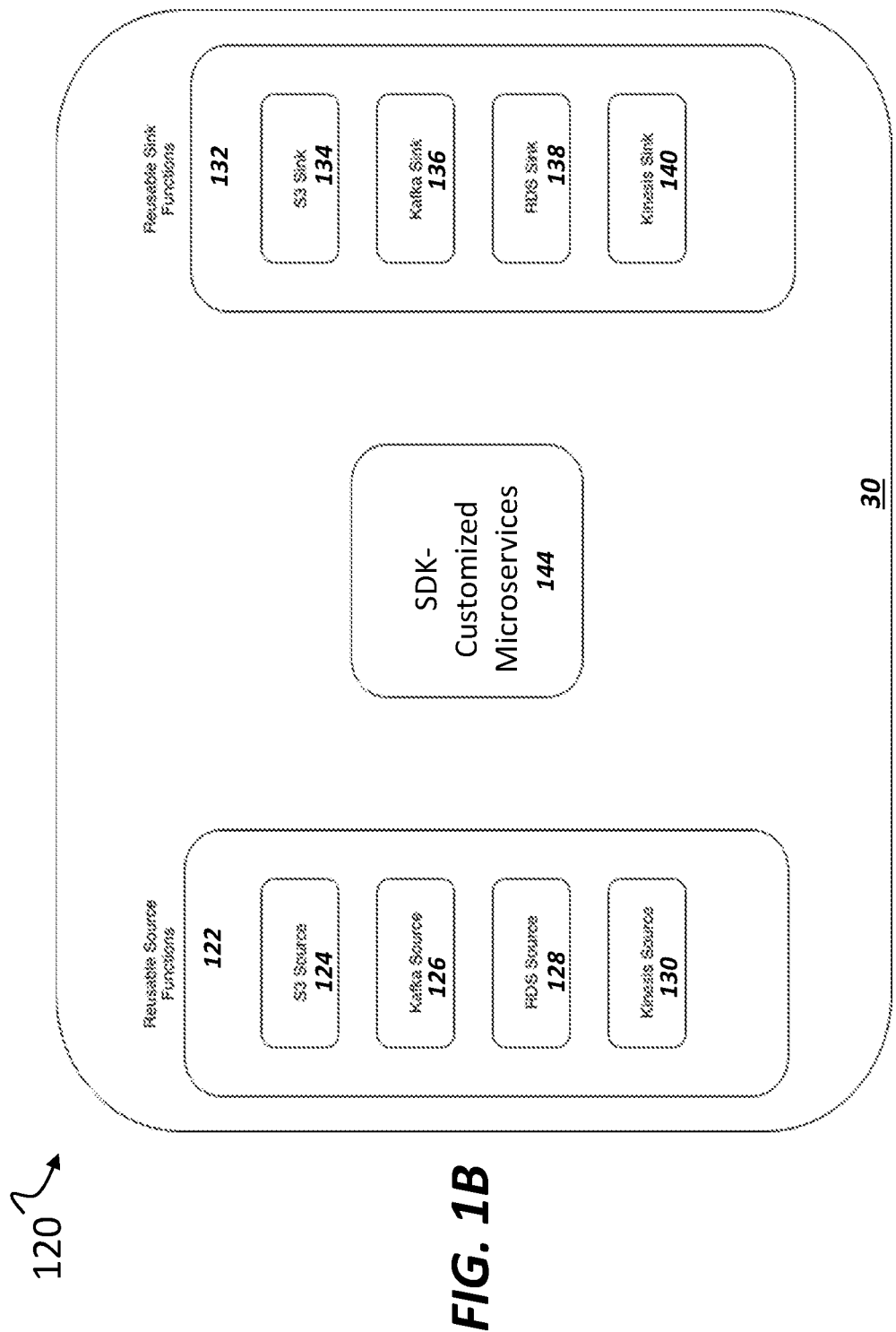
FIG. 1B illustrates an embodiment of an architecture for implementing serverless stacks.

FIG. 1B illustrates an embodiment of an architecture for implementing serverless stacks. The arrangement 120 provides a framework for building a given serverless stack by implementing one or more customized microservices provided by an SDK according to the present embodiments, which microservices are represented by the SDK-customized microservices 144, with more detailed examples shown in FIGS. 4 and 5 to follow. The arrangement 120 includes a set of reusable source functions 122 and reusable sink functions 132. The reusable source functions 122 may be any suitable source function, such as known streaming data sources. Non-limiting examples are shown as S3 source function 124, Kafka source function 126, RDS source function 128, and Kinesis source function 130. The reusable sink functions 132 may be any suitable source function, such as known streaming data sources. Non-limiting examples are shown as S3 sink function 134, Kafka sink function 136, RDS sink function 138, and Kinesis sink function 140. Implementing the reusable source functions 122 and the reusable sink functions 132 together with the SDK-customized microservices 144 provides a convenient platform to build serverless application stacks as detailed below.

Figure 2:
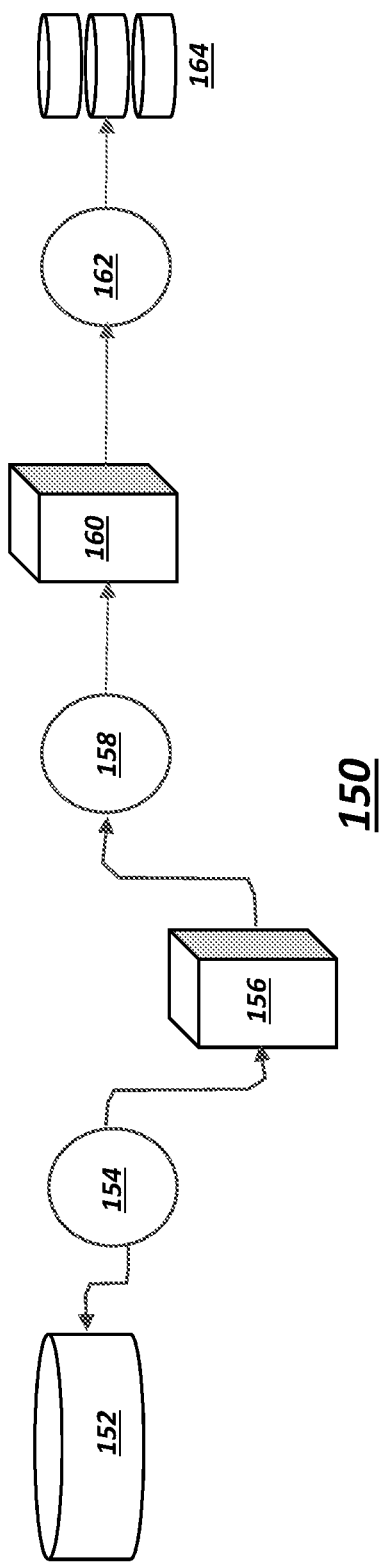
FIG. 2 illustrates an embodiment of a serverless stack.

FIG. 2 depicts an exemplary serverless application stack, in schematic form. As shown, a serverless application stack 150 may include various components, including sources, sinks, streaming services, functions, and so forth. In particular, the serverless application stack 150 may include a message bus producer 152, which component may be designated by a user of SDK 100. The serverless application stack 150 may also include one or more user functions, such as an Amazon Lambda® function. As such, in the implementation of serverless application stack 150, the user functions may be created by a user, selected using SDK 100, and stored in a serverless provider container. In the example of FIG. 2, the serverless application stack 150 includes a user function 154, user function 158, and user function 162, arranged to process an event or message in a series manner. The serverless application stack 150 further includes a series of data streaming applications, shown as application 156 and application 160, arranged in series fashion to process the event, in conjunction with the user functions. The serverless application stack 150 also includes a message bus consumer 164, which destination may be designated by the user via SDK 100.

In operation, the serverless application stack 150 may be launched or controlled by a user to implement message processing when desired. According to embodiments of the disclosure, the SDK 100 or similar SDKs may provide enhanced functioning of a serverless application stack, as well as ease of implementation for building serverless application stacks, as detailed below.

Figure 3:
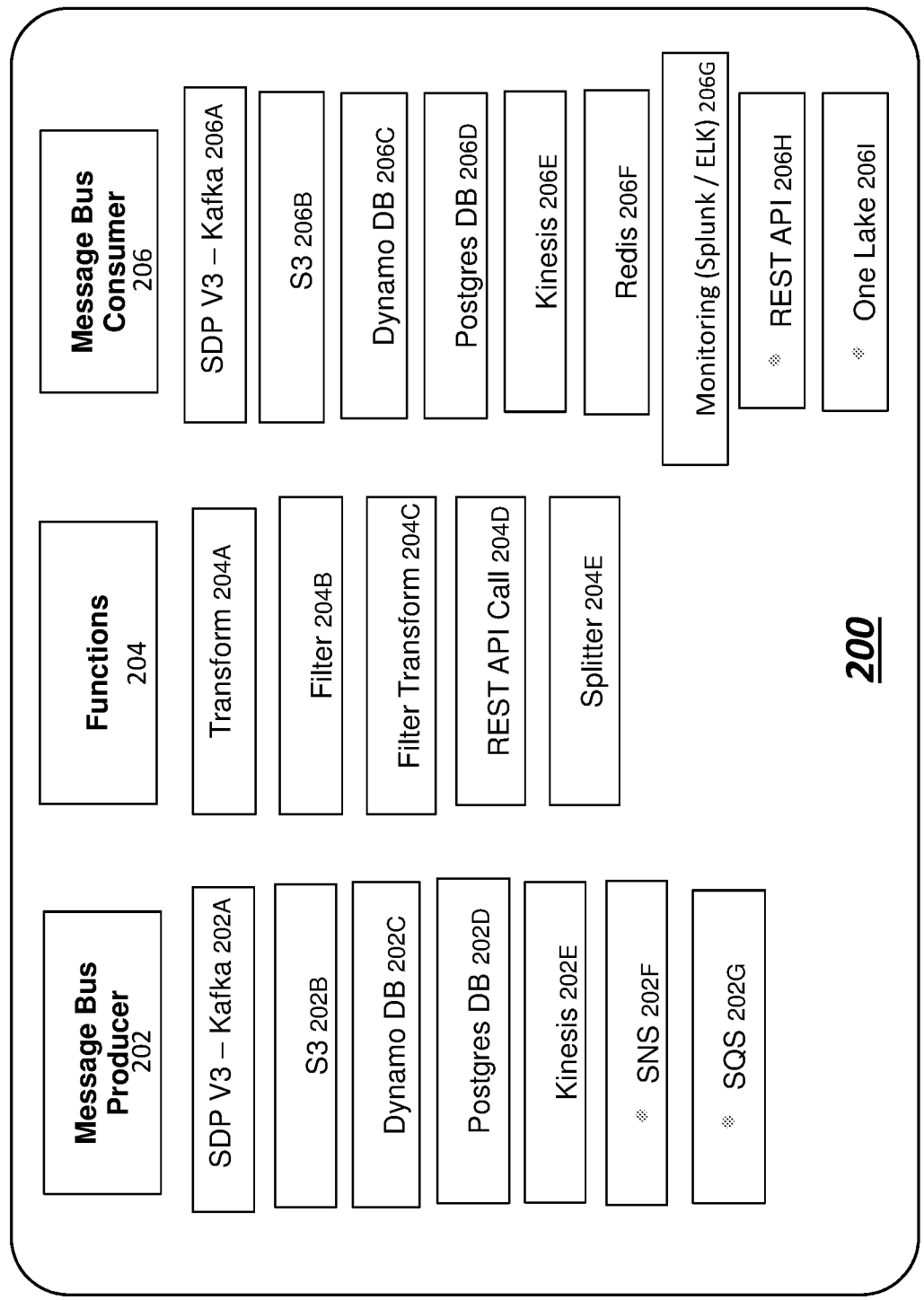
FIG. 3 illustrates an embodiment of a user interface.

Turning now to FIG. 3, there is shown an exemplary SDK menu. The SDK menu 200 may be arranged to work with different cloud computing providers. The SDK menu 200 may represent an implementation of an SDK according to some embodiments of the disclosure. The SDK menu 200 may include a message bus producer set 202, a function set 204, as well as a message bus consumer set 206. Each of these sets may include a plurality of selections, including commercial components, as shown. In some implementations, the SDK menu 200 may be presented in a user interface. By providing a variety of selections, the SDK menu allows a user to readily tailor construction of a serverless application stack according to the specific application. Notably, the various selections are merely exemplary, and other combinations are possible as will be appreciated by those of skill in the art.

Figure 4:
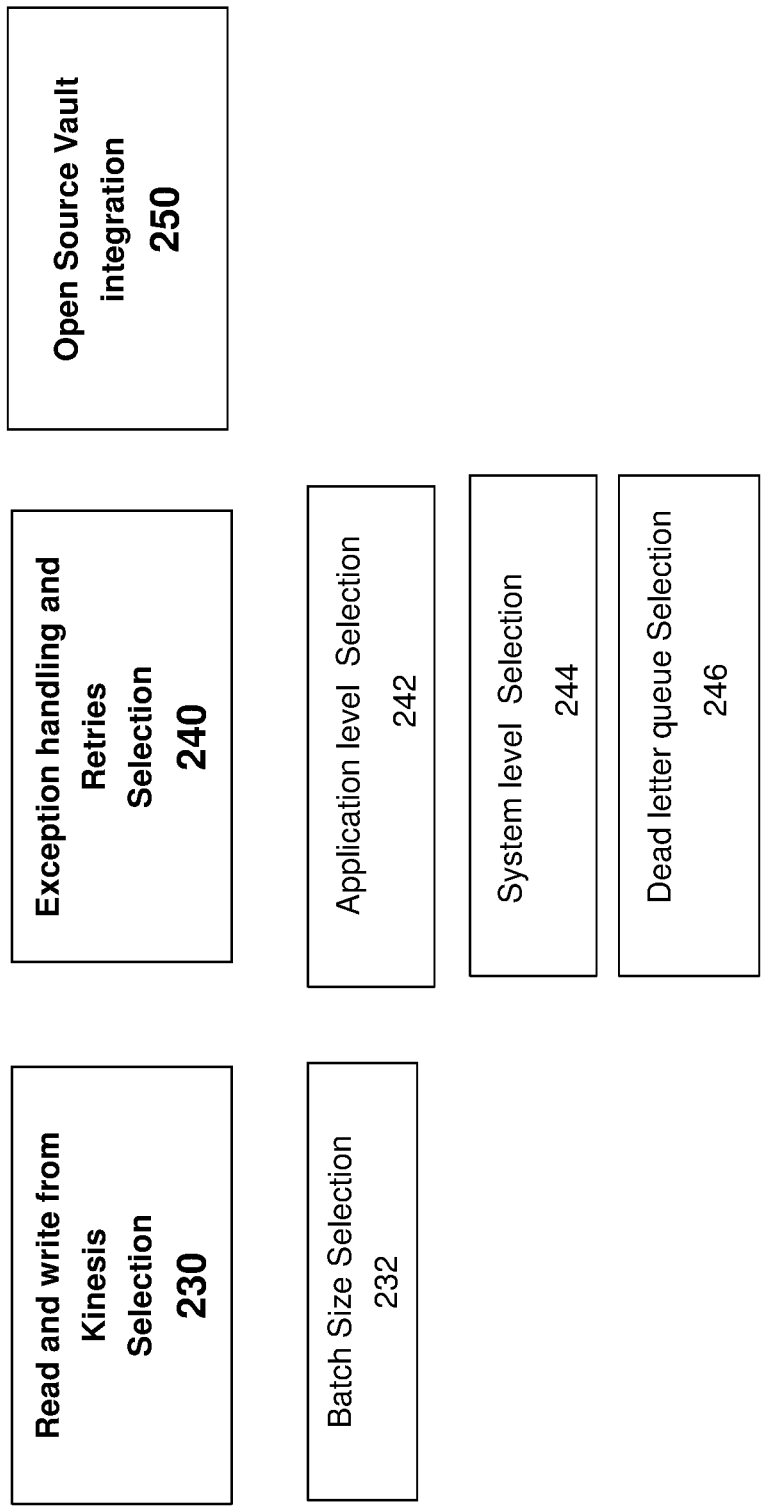
FIG. 4 illustrates an embodiment of a user interface.

Turning now to FIG. 4, there is shown an exemplary function menu. The function menu 220 may represent an implementation of a portion of an SDK according to some embodiments of the disclosure. The function menu 220 may include a message bus producer set 202, a function set 204, as well as a read/write selection 230, an exception handling selection 240, and Open Source Vault Integration selection 250, which selection may be used for storing the credentials.

These selections may have submenus, such as batch size selection 232, application level selection 242, system level selection 244, and dead letter queue selection 246. In some implementations, these functions may be implemented automatically using an SDK, such as SDK 100, while in other implementations, one or more of these functions may be selectable by a user of an SDK.

Figure 5:
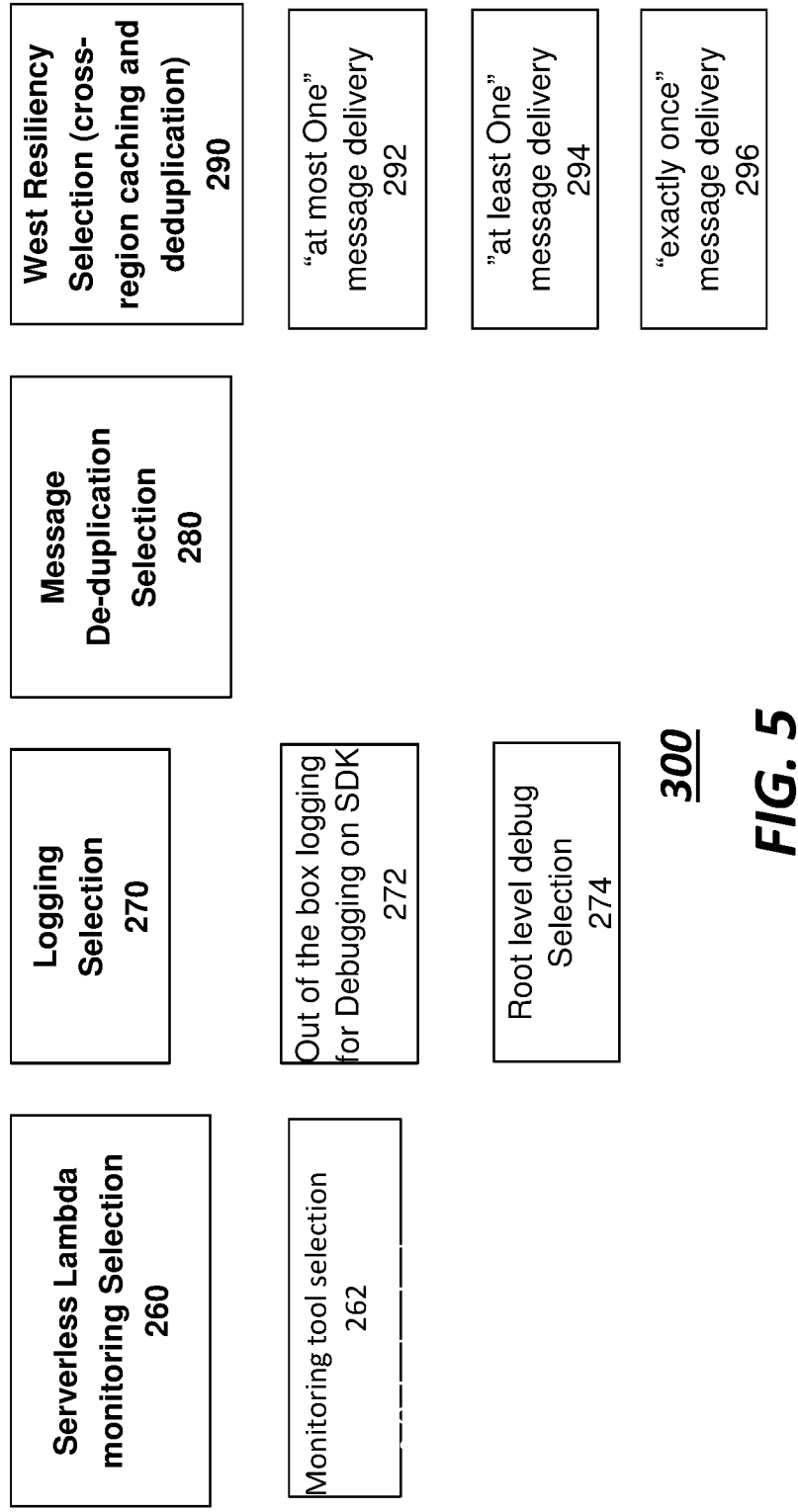
FIG. 5 illustrates another embodiment of a user interface.

Turning now to FIG. 5, there is shown an exemplary function menu. The function menu 300 may represent an implementation of a portion of an SDK according to some embodiments of the disclosure. The function menu 300 may include a Serverless Lambda monitoring Selection 260, Logging selection 270, message de-duplication selection 280, and West resiliency selection 290. In some examples, sub-menu items may be associated with one or more selections, such as a monitoring tool selection 262, out of box logging selection 272, and root level debug selection 274. The West resiliency selection 290 may include selections to enable cross region caching and deduplication for achieving "at most One" 292, "at least One" 294 and "exactly once" 296 message delivery for implementing a streaming data serverless application stack.

In some implementations, these functions may be implemented automatically using an SDK, such as SDK 100, while in other implementations, one or more of these functions may be selectable by a user of an SDK. In some implementations, the functions of FIG. 4 and FIG. 5 may be combined together within a given SDK.

Figure 6:
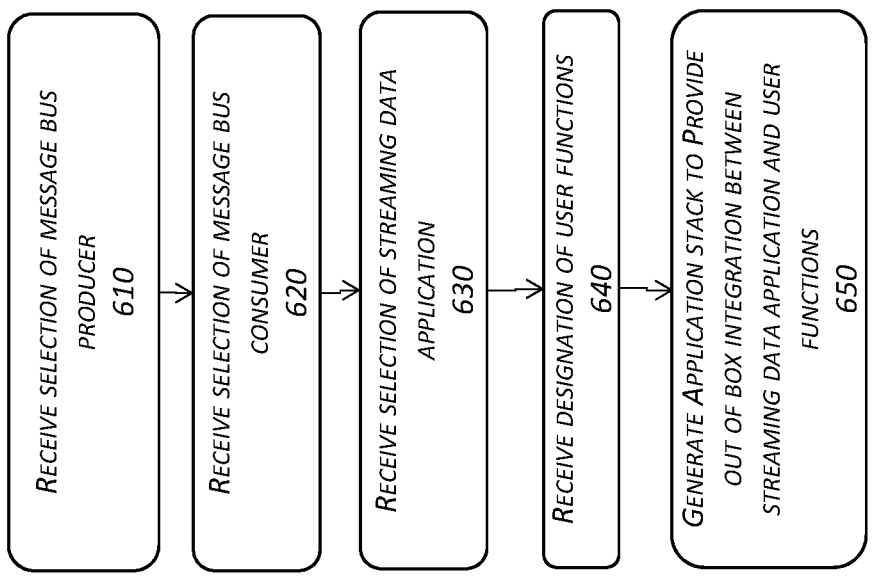
FIG. 6 illustrate an embodiment of a first logic flow.

FIG. 6 illustrates an embodiment of a first logic flow, shown as logic flow 600. The logic flow 600 may be used to develop a serverless application stack. At block 610, a selection of message bus producer is received. In various embodiments, a message bus producer may include a streaming data application or a database, for example.

At block 620 a selection of a message bus consumer is received, similar to the selection of message bus producer.

At block 630, a selection of a streaming data application is received. In some examples, the streaming data application may be used as a message bus producer, or may form a part of a serverless application stack, in addition to the message bus producer. Examples of suitable steaming data applications include Amazon Kinesis® or Apache® Storm and the like.

At block 640, a designation of a set of user functions is received. The user functions may be implemented in one or more containers, within a serverless platform, such as Amazon Lambda or similar platform.

At block 650, a serverless application stack is generated to provide out of box integration between the streaming data application(s) and set of user functions. As such, the serverless application stack provides a means for a developer to build and deploy a serverless system that is managed by a cloud services provider.

Figure 7:
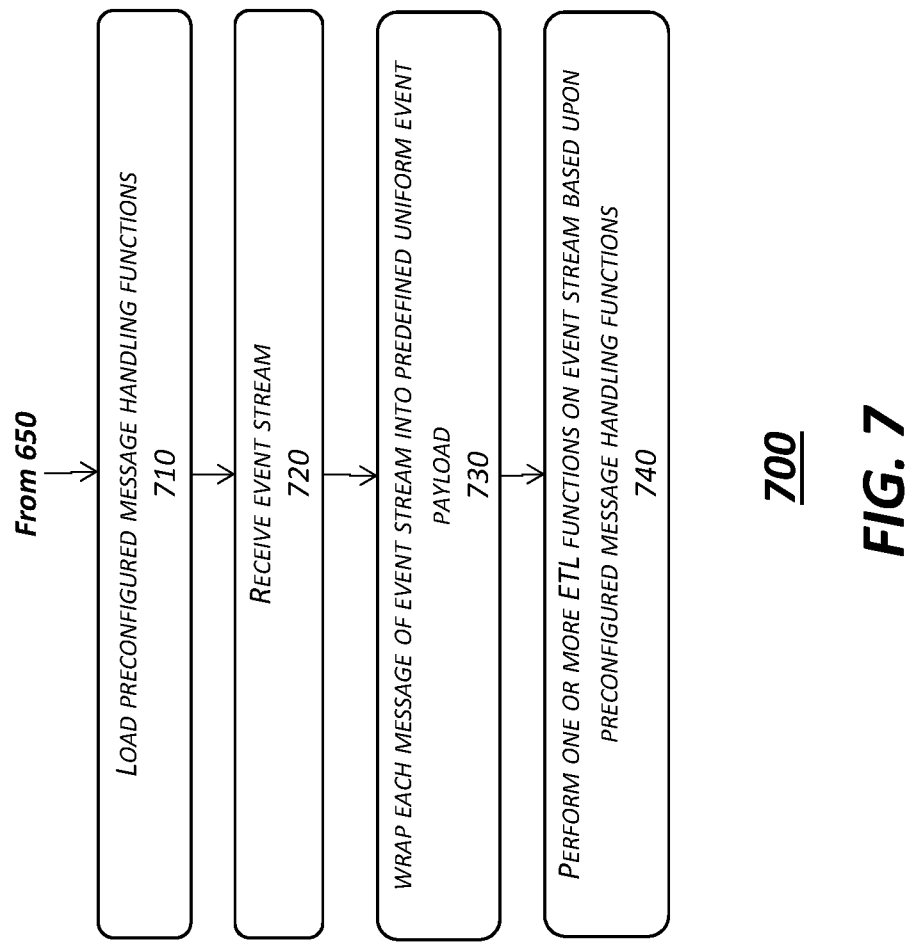
FIG. 7 illustrate an embodiment of a second logic flow.

FIG. 7 illustrates an embodiment of a second logic flow, shown as logic flow 700. The flow proceeds from block 650, described above. At block 710, a set of preconfigured message handing functions are loaded or stored in a serverless application stack.

At block 720, an event stream is received. The event stream may be generated by a streaming application of the serverless application stack.

At 730, each message of the event stream is wrapped into a predefined uniform event payload. This procedure will help to debug the messages in production.

At block 740, a group of one or more extract, transform, and load (ETL) functions are performed on the event stream, based upon the preconfigured message handling functions. During real time streaming of the event stream, for example, the messages of the event stream may be filtered based upon business logic. Notably, the messages may also be enriched with additional fields, and may be altered to remove unwanted fields.

Figure 8:
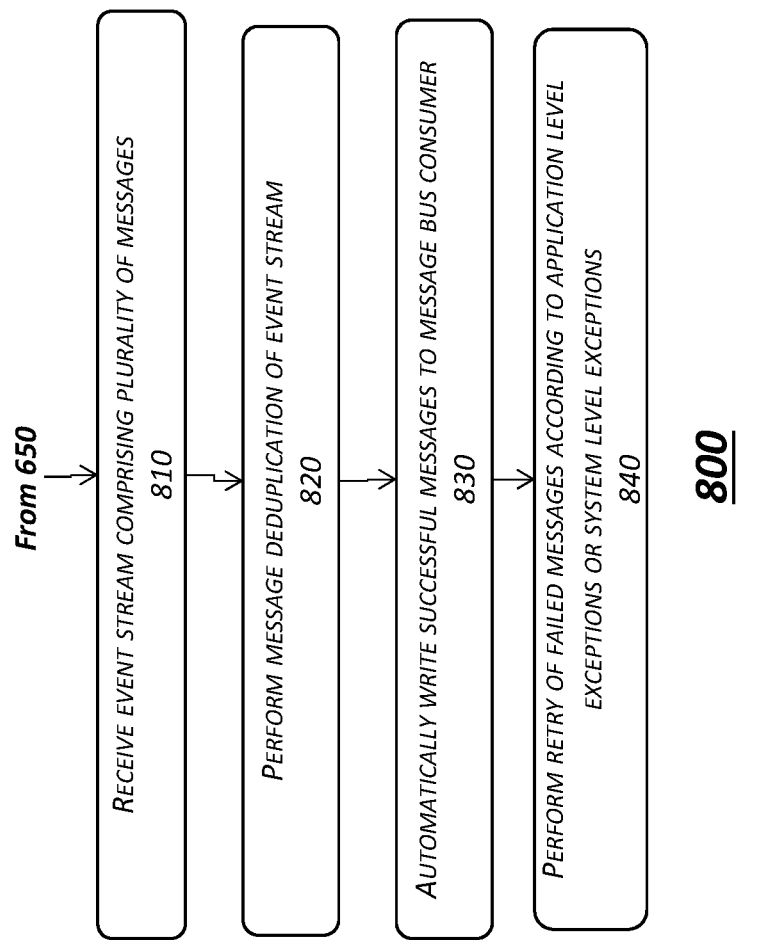
FIG. 8 illustrate an embodiment of a third logic flow.

FIG. 8 illustrates an embodiment of a third logic flow, shown as logic flow 800. The flow proceeds from block 650, described above. At block 810, an event stream is received, comprising plurality of messages, such as from a streaming data application.

At block 820, a message deduplication operation is performed on the event stream. For example, the message deduplication may involve outputting a set of messages where each message is unique.

At block 830, the successful messages are automatically written to a message bus consumer, as specified in the serverless application stack.

At block 840, a retry of failed messages is performed according to application level exceptions or system level exceptions. In one implementation, application level retries may proceed for a fixed number of times, where the serverless application stack places a given failed message back into the data streaming application. In one implementation, system level retries are performed by retrying a message exception in a manner where all message processing is blocked until the exception has been resolved.

Figure 9:
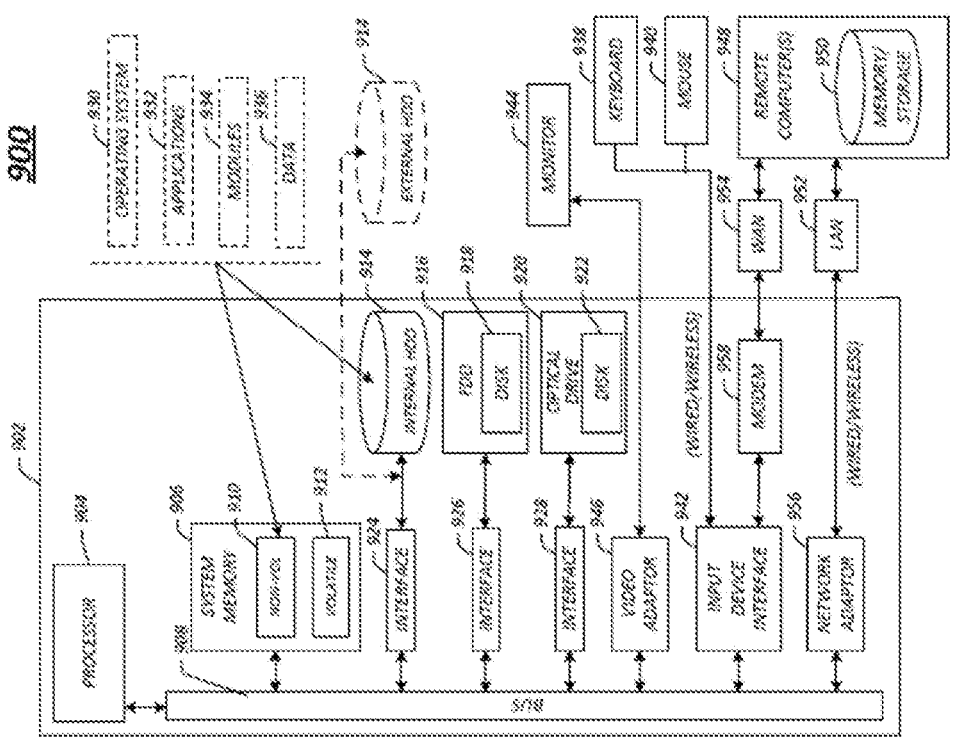
FIG. 9 illustrates an embodiment of a computing architecture.

FIG. 9 illustrates an embodiment of a computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of an implementation of the software development kit 100. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units (910, 912), including an operating system 930, one or more application programs 932, other program modules 934, and program data 936. In one embodiment, the one or more application programs 932, other program modules 934, and program data 936 can include, for example, the various applications and/or components of the SDK 100.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, just a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 overthe-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium storing computer-readable program code executable by a processor to:
   receive a designation of a message bus producer;
   receive a set of business logic to be stored in a set of containers, the set of business logic comprising a set of user-generated program code;
   receive a designation of a message bus consumer;
   receive a designation of a set of message-handling functions;
   generate a serverless application stack, based upon the message bus producer, the set of business logic, the message bus consumer, and the set of message-handling functions; and
   cause the serverless application stack to:
      receive a message stream from the message bus producer as streaming data;
      process the message stream according to at least one function, stored in the set of containers;
      perform at least one message-handling function of the set of message-handling functions on the message stream; and
      transport the set of messages to the message bus consumer, the at least one message-handling function comprising a deduplication function, the deduplication function comprising logic to perform an assignment of a unique identifier for storage in cache memory for each message of the message stream.

2. The non-transitory computer-readable storage medium of claim 1, the message bus producer comprising a cloud-based streaming service.

3. The non-transitory computer-readable storage medium of claim 1, the message bus consumer comprising at least one of: a cloud-based streaming service, a cloud based storage system, and a data lake.

4. The non-transitory computer-readable storage medium of claim 1, the set of containers comprising a plurality of containers, the serverless application stack to:
   process the set of messages using a first function, stored in a first container of the set of containers; and
   process the set of messages using a second function, stored in a second container of the set of containers, wherein a given message is processed by the first function and the second function in a sequential manner.

5. The non-transitory computer-readable storage medium of claim 1, the at least one message-handling function comprising a filter function to filter the message stream based upon the set of business logic.

6. The non-transitory computer-readable storage medium of claim 1, the at least one message-handling function comprising a transform function to provide an additional field within at least one message of the message stream or to remove an unwanted field.

7. The non-transitory computer-readable storage medium of claim 1, the at least one message-handling function comprising an exception-handling function, to retry transmission of a failed message.

8. The non-transitory computer-readable storage medium of claim 7, the exception-handling function comprising:
   an application level exception, to retry transmission of the failed message for a predetermined number of instances, or
   a system level exception, to suspend message processing of the message stream until the failed message has been successfully transmitted.

9. An electronic device, comprising:
   a storage device; and
   logic, at least a portion of the logic implemented in circuitry coupled to the storage device, the logic to:
      receive a designation of a message bus producer;
      receive a set of business logic to be stored in a set of containers, the set of business logic comprising a set of user-generated program code;
      receive a designation of a message bus consumer;
      receive a designation of a set of message-handling functions;
      generate a serverless application stack, based upon the message bus producer, the set of business logic, the message bus consumer, and the set of message-handling functions; and
      cause the serverless application stack to:
         receive a message stream from the message bus producer as streaming data;
         process the message stream according to at least one function, stored in the set of containers;
         perform at least one message-handling function of the set of message-handling functions on the message stream; and
         transport the set of messages to the message bus consumer, the at least one message-handling function comprising a deduplication function, the deduplication function comprising logic to perform an assignment of a unique identifier for storage in cache memory for each message of the message stream.

10. The electronic device of claim 9, the set of containers comprising a plurality of containers, the serverless application stack to:
  process the set of messages using a first function, stored in a first container of the set of containers; and
  process the set of messages using a second function, stored in a second container of the set of containers, wherein a given message is processed by the first function and the second function in a sequential manner.

11. The electronic device of claim 9, the at least one message-handling function comprising a filter function to filter the message stream based upon the set of business logic.

12. The electronic device of claim 9, the at least one message-handling function comprising a transform function to provide an additional field within at least one message of the message stream or to remove an unwanted field.

13. The electronic device of claim 9, the at least one message-handling function comprising an exception-handling function, to retry transmission of a failed message.

14. A method, comprising:
  receiving a set of building blocks for a serverless application stack, the set of building blocks, comprising:
    a set of business logic to be stored in a set of containers, the set of business logic comprising a set of user-generated program code;
    a designation of a message bus consumer; and
    a designation of a set of message-handling functions; and
  generating the serverless application stack, based upon a message bus producer, the set of business logic, the message bus consumer, and the set of message-handling functions, wherein the serverless application stack is to:
    receive a message stream from the message bus producer as streaming data;
    process the message stream according to at least one function, stored in the set of containers;
    perform at least one message-handling function of the set of message-handling functions on the message stream; and
    transport the set of messages to the message bus consumer, the at least one message-handling function comprising a deduplication function, the deduplication function comprising logic to perform an assignment of a unique identifier and storage in cache memory of the unique identifier for each message of the message stream.

15. The method of claim 14, the set of containers comprising a plurality of containers, the serverless application stack to:
  process the set of messages using a first function, stored in a first container of the set of containers; and
  process the set of messages using a second function, stored in a second container of the set of containers, wherein a given message is processed by the first function and the second function in a sequential manner.

16. The method of claim 14, the at least one message-handling function comprising a filter function to filter the message stream based upon the set of business logic.

17. The method of claim 14, the at least one message-handling function comprising a transform function to provide an additional field within at least one message of the message stream or to remove an unwanted field.

* * * * *